F. SMITH.
LANDING ATTACHMENT FOR PARACHUTES.
APPLICATION FILED NOV. 26, 1919.
1,378,198.
Patented May 17, 1921.
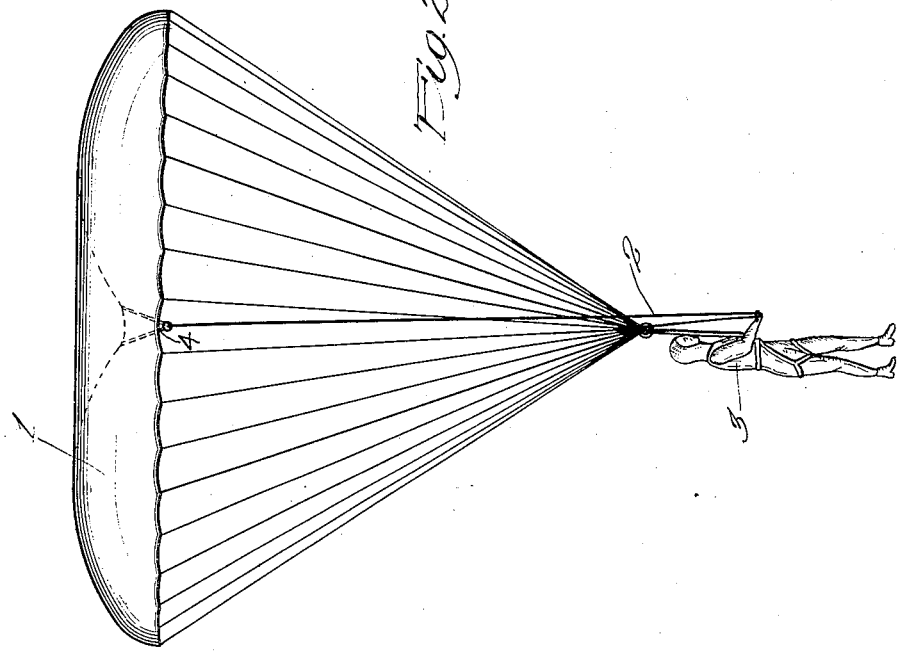
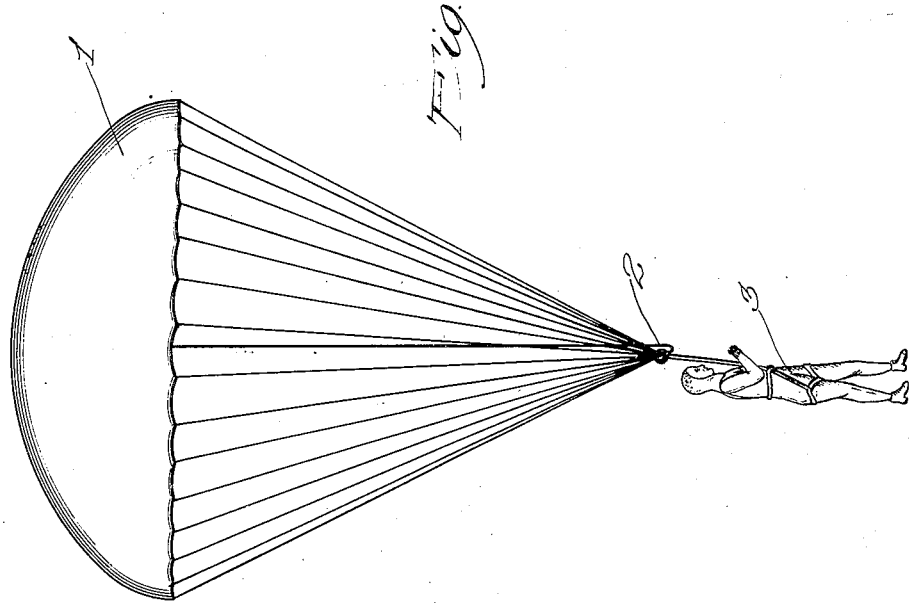
Witness:
INVENTOR
Floyd Smith
By Chamberlin & Brendonreid
ATTORNEY

UNITED STATES PATENT OFFICE.

FLOYD SMITH, OF CHICAGO, ILLINOIS, ASSIGNOR TO FLOYD SMITH AERIAL EQUIPMENT COMPANY, A CORPORATION OF ILLINOIS.

LANDING ATTACHMENT FOR PARACHUTES.

1,378,198. Specification of Letters Patent. Patented May 17, 1921.

Application filed November 26, 1919. Serial No. 340,850.

*To all whom it may concern:*

Be it known that I, FLOYD SMITH, a citizen of the United States, residing at Chicago, county of Cook, State of Illinois, have invented a certain new and useful Improvement in Landing Attachments for Parachutes, and declare the following to be a full, clear, and exact description of the same, such as will enable others skilled in the art to which it pertains to make and use the same, reference being had to the accompanying drawings which form a part of this specification.

My invention has for its object to equip a parachute with a simple and novel expedient by means of which the parachutist may momentarily check the rapidity of descent so as to make it possible to reduce the speed of descent just before landing.

The various features of novelty whereby my invention is characterized will hereinafter be pointed out with particularity in the claim; but, for a full understanding of my invention and of its object and advantages, reference may be had to the following detailed description taken in connection with the accompanying drawing, wherein:

Figure 1 is an elevation of a descending parachute, during normal descent, embodying the present invention; and Fig. 2 is a view similar to Fig. 1 showing the conditions as they exist after the means for checking the speed of descent has been brought into play.

Referring to the drawing, 1 represents a parachute of any usual or suitable construction. 2 is a cord or other suitable pulling member attached to the center of the parachute and extending downwardly to a point within reach of a person, such as indicated at 3, suspended from the parachute. In order to maintain the lower end of the member 2 properly located when not in use it may be attached to some part of the suspending means between the parachute proper and the parachutist.

If, just before landing, the parachutist pulls down sharply on the member 2, a part of his weight is transferred from the edges of the parachute to the center thereof, thus drawing the center down, forcing the compressed air outwardly and thus bringing about an expansion or increase in diameter of the edge or rim. In other words, a larger effective horizontal area component than that which exists under normal conditions of descent is brought about and therefore the downward speed of the parachute will be decreased.

In order to make the expedient effective, the pulling means must be such that the depression of the center of the parachute will positively follow a pull on the lower end of the pulling means. This can be accomplished only by attaching the cord directly to the center of the top of the parachute without the intervention of resilient or yieldable means. In the arrangement shown, the cord is attached directly to the vent ring, or other part fixed to the center of the parachute, by a bridle, 4, so that there is no slack to be taken up or any yielding between the pulling means and the center of the parachute when the rope is pulled.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claim.

I claim:

The combination with a parachute comprising a canopy member, a harness for a person, and suspending means extending between said harness and the periphery of the canopy for the purpose of carrying the load from said periphery, of a rope connected to the center of the canopy in such a manner that a pull on the rope is transmitted positively to said center, said rope extending downward to a point within reach of a person carried by said harness.

In testimony whereof, I sign this specification.

FLOYD SMITH.